United States Patent [19]
Shimotoso et al.

[11] Patent Number: 5,881,351
[45] Date of Patent: Mar. 9, 1999

[54] PRINTING APPARATUS HAVING READER, PRINTER, COVER, AND TRANSFER PATH FROM PRINTER TO COVER

[75] Inventors: Tadashi Shimotoso, Kasuga; Yuzo Kawano, Ogori, both of Japan

[73] Assignee: Matsushita Electric Industrial Co., Ltd., Osaka, Japan

[21] Appl. No.: 851,932

[22] Filed: May 6, 1997

[30] Foreign Application Priority Data

May 13, 1996 [JP] Japan .................................. 8-117594

[51] Int. Cl.$^6$ .................................................. G03G 15/00
[52] U.S. Cl. ............................................................ 399/377
[58] Field of Search ................................. 399/377, 367, 399/379, 380

[56] References Cited

U.S. PATENT DOCUMENTS

| | | | |
|---|---|---|---|
| 3,865,482 | 2/1975 | Bendall et al. ........................ | 399/364 |
| 4,843,437 | 6/1989 | Hamano ............................. | 399/379 X |
| 5,061,962 | 10/1991 | Takahashi .......................... | 399/370 X |
| 5,416,570 | 5/1995 | Kondou ................................. | 399/367 |

*Primary Examiner*—Arthur T. Grimley
*Assistant Examiner*—Quana Grainger
*Attorney, Agent, or Firm*—Stevens, Davis, Miller & Mosher, L.L.P.

[57] ABSTRACT

A printing apparatus includes, a first body including a reader for reading an information on a first workpiece, and a printer for printing an image on a second workpiece, and a second body swingable relative to the first body on a swing axis over the reader to cover and uncover the reader, wherein the printing apparatus further includes a workpiece transfer path for moving therein the second workpiece with the printed image from the printer to the second body.

1 Claim, 5 Drawing Sheets

PRINTING APPARATUS HAVING READER, PRINTER, COVER, AND TRANSFER PATH FROM PRINTER TO COVER

BACKGROUND OF THE INVENTION AND RELATED ART STATEMENT

The present invention relates to a printing apparatus including a reader for reading an information on a first workpiece, and a printer for printing an image on a second workpiece.

In prior-art printing apparatuses as described above, a sheet with a printed image is discharged from the printer into a receiver extending horizontally outward from a casing including the reader and the printer so that the sheet is stored on the receiver at least temporarily.

OBJECT AND SUMMARY OF THE INVENTION

An object of the present invention is to provide a printing apparatus including a reader for reading an information on a first workpiece, a printer for printing an image on a second workpiece, and a cover swingable on a swing axis to cover and uncover the reader, a horizontal size of which apparatus is significantly decreased in comparison with the prior-art printing apparatuses, and which reader is accessible in all horizontal directions.

According to the present invention, a printing apparatus comprising, a first body including a reader for reading an information on a first workpiece (for example, a scanner inputting the information, an optical character reader (OCR), a CCD camera inputting the information or the like), and a printer for printing an image on a second workpiece by xerography printing, ink printing (for example, ink-jet printing, mimeograph printing or thermal ink-transfer printing) or the like, and a second body which is swingable (for manually setting the first workpiece onto the reader and/or manually removing the from the reader when the first workpiece cannot be automatically set onto and/or removed from the reader, or for varying a distance between the second body and the reader according to a thickness of the second workpiece) relative to the first body on a swing axis, and which is arranged over the reader to cover and uncover the reader, wherein the printing apparatus further comprises a workpiece transfer path for moving therein the second workpiece with the printed image from the printer to the second body. The information read by the reader from the first workpiece may be recorded in the reader or be transmitted to a recording or data processing device to be recorded or processed therein, to the printer or another printer to be used to print the image, or to a facsimile telegraph. The image may be printed by the printer on the basis of the information read by the reader or on the basis of data transmitted from the recording or data processing device, another reader, or the facsimile telegraph.

Since the workpiece transfer path moves therein the second workpiece with the printed image from the printer to the second body arranged over the reader so that the second workpiece with the printed image is stored on the second body at least temporarily, the second workpiece with the printed image is prevented from being discharged horizontally outward from the first body to be stored at a horizontal outside of the first body at least temporarily. Therefore, a horizontal size or area of the printing apparatus of the present invention significantly decreases in comparison with the prior-art printing apparatus, and the printing apparatus or reader is accessible in all horizontal directions for users of the apparatus.

When the second body includes a supplier path through which the first workpiece is supplied onto the reader and the workpiece transfer path extends between the supplier path and the swing axis, the workpiece transfer path can be arranged close to the swing axis so that an undesirable deformation of the workpiece transfer path caused by a swing motion of the second body is restrained, and the horizontal size or area of the printing apparatus is kept small although an auto document feeder for exchanging the first workpiece for substitute one thereof on the reader is mounted on the second body. When the second body includes a removal path through which the first workpiece is removed away from the reader, and the workpiece transfer path extends between the removal path and the swing axis, the workpiece transfer path can be arranged close to the swing axis so that the undesirable deformation of the workpiece transfer path caused by the swing motion of the second body is restrained, and the horizontal size or area of the printing apparatus is kept small although the auto document feeder is mounted on the second body. When the workpiece transfer path extends between the swing axis and the first workpiece on the reader, the workpiece transfer path can be arranged close to the swing axis so that the undesirable deformation of the workpiece transfer path caused by the swing motion of the second body is restrained.

It is preferable for decreasing the horizontal size or area of the printing apparatus or the first body thereof that the printer is arranged under the reader. When the second workpiece with the printed image is moved onto the second body over the first workpiece which will be moved onto the reader, the horizontal size or area of the printing apparatus is kept small although the auto document feeder is mounted on the second body. When the second workpiece with the printed image is moved onto the second body over the first workpiece which was removed away from the reader onto the second body, the horizontal size or area of the printing apparatus is kept small although the auto document feeder is mounted on the second body.

When the printing apparatus includes a space between the first body and the second body, and the workpiece transfer path extends through the space so that the workpiece transfer path is divided by the space into a first workpiece transfer path in the first body and a second workpiece transfer path in the second body, that is, the workpiece transfer path includes no connection contact surface extending between the first body and the second body to guide the second workpiece therebetween, an undesirable deformation or deflection of the workpiece transfer path between the first body and the second body is prevented from being caused by the swing motion of the second body.

When the workpiece transfer path includes a transfer roller rotatable on a rotational axis to drive the second workpiece with the printed image to the second body in the workpiece transfer path, and the rotational axis is substantially parallel to the swing axis, a horizontal size of the apparatus in a direction parallel to the swing axis is kept small, because the workpiece transfer path extends substantially parallel to the swing axis adjacent to the reader from the printer. When the rotational axis is substantially perpendicular to the swing axis, a horizontal size of the apparatus in a direction perpendicular to the swing axis is kept small, because the workpiece transfer path extends substantially perpendicular to the swing axis adjacent to the reader from the printer.

When the second body includes an exchange roller rotatable on an exchange roller axis to drive the first workpiece relative to the second body, and the rotational axis may substantially perpendicular or parallel to the exchange roller axis.

When the workpiece transfer path includes in the second body a first guide surface along which the second workpiece with the printed image is guided when the second body is closed to cover the reader or close to the reader, and a second guide surface along which the second workpiece with the printed image is guided when the second body is opened to uncover the reader or separated away from reader, and the first and second guide surfaces form an enlarged part of the workpiece transfer path whose cross sectional area is relatively larger than that of the other part of the workpiece transfer path adjacent to the enlarged part, the second workpiece with the printed image is guided or directed for smooth proceeding thereof in the workpiece transfer path irrespective of at which position the second body is, an opened position at which the second workpiece with a large thickness is pressed against the reader by the second body, the second workpiece is manually removed from or set on the reader or the reader is exposed or uncovered to be prevented from being covered by the second body, or a closed position at which the second workpiece with a small thickness on the reader is covered by the second body or the reader is covered by the second body without the second workpiece between the second body and the reader.

When the first guide surface along which a leading end of the second workpiece with the printed image is guided in the second body when the second body is closed to cover the reader and the second guide surface along which the leading end of the second workpiece with the printed image is guided in the second body when the second body is opened to uncover the reader form the enlarged part of the workpiece transfer path whose cross sectional area is relatively larger than that of the other part of the workpiece transfer path adjacent to the enlarged part, and the transfer roller is arranged between the space and the enlarged part in the second body, the leading end is driven securely in the enlarged part by the transfer roller with a minimum distance between the leading end and the transfer roller for preventing a buckling or undesirable bending of the second workpiece in the enlarged part.

DETAILED DESCRIPTION OF PREFERRED EMBODIMENTS

Figure 1:
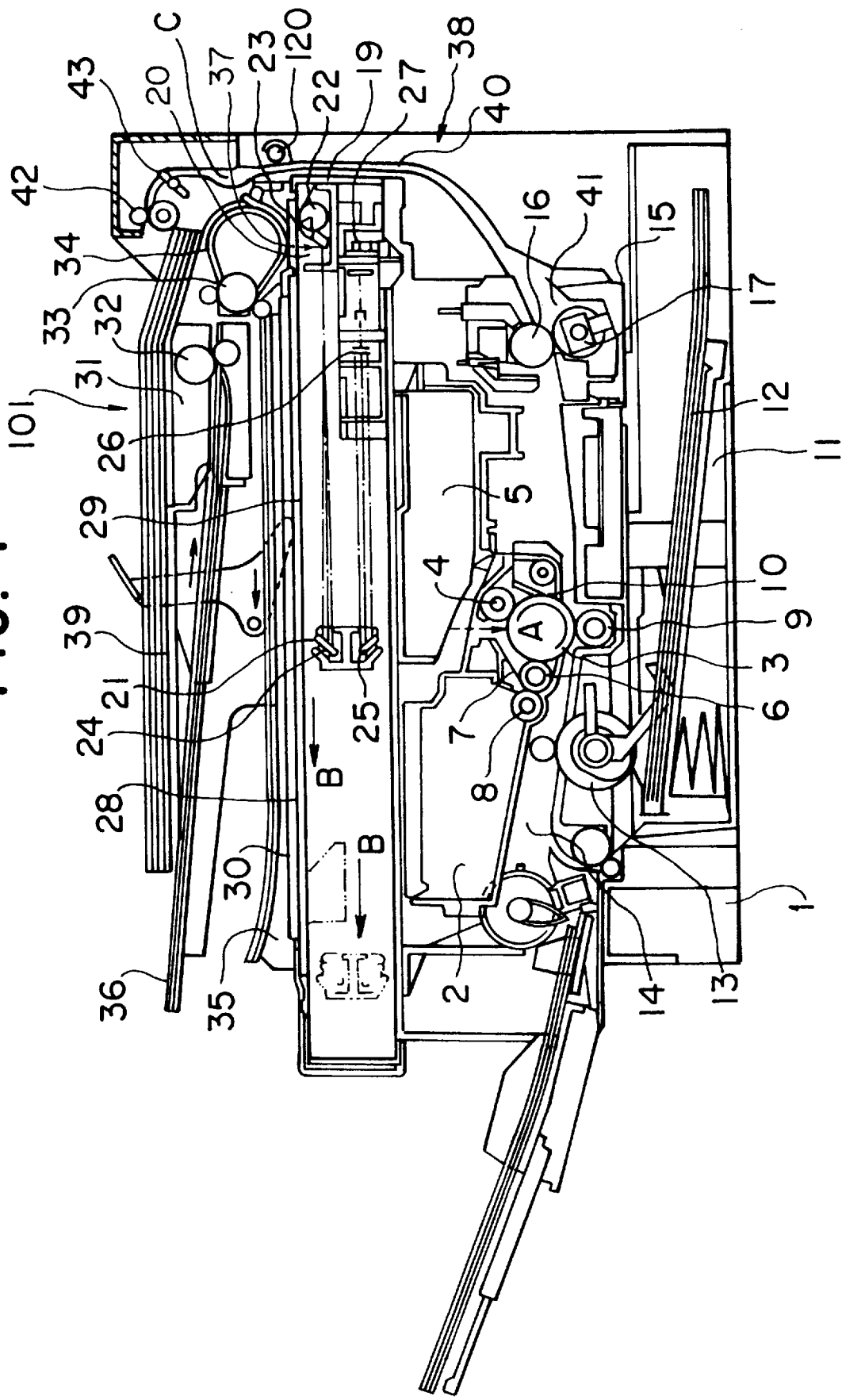
FIG. 1 is a partially cross-sectional view showing a printing apparatus of the present invention.
Figure 2:
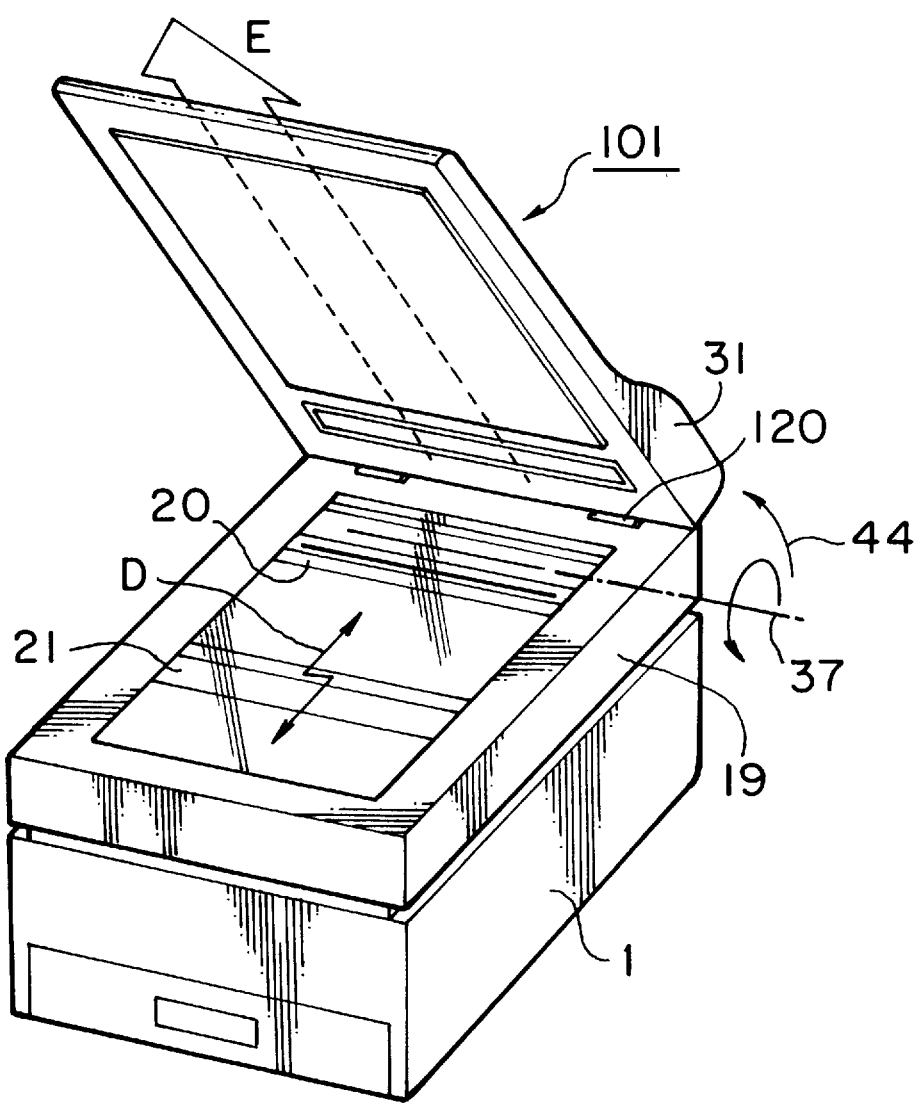
FIG. 2 is an oblique projection view showing the printing apparatus when a reader in a first body is uncovered by a second body.

In FIG. 1, a printing apparatus 101 with a xerography printer is shown as an embodiment of the present invention. A printer 1 as the claimed printer includes a controller 2 for outputting signals based on data read by a reader 19 in the printing apparatus or transmitted from an outside of the printing apparatus, to a laser beam projection optical device 5 for forming an electrostatic latent image on a photoconductive roller 3 by a laser beam. According to a rotation of a developing roller 6, toner supplied from a toner supply roller 8 is coated by a coating blade 7 evenly onto the developing roller 6 to be electrified thereon at, for example, negative voltage. The photoconductive roller 3 is, according to a rotation thereof as shown by arrow A in FIG. 1, electrified by an electrifier 4 at, for example, negative voltage, and subsequently the laser beam projection optical device 5 forms the electrostatic latent image on the photoconductive roller 3 by discharging the electrification on a part of the photoconductive roller 3 with the laser beam. An image is developed on the photoconductive roller 3 from the electrostatic latent image by adhesion of the toner from the developing roller 6 to the part of the photoconductive roller 3.

A sheet 12 is fed one by one from a sheet cassette 11 to the photoconductive roller 3 by a sheet supply roller 13 through a sheet supply path 14, and is pressed between the photoconductive roller 3 and a toner attracting roller 9 with, for example, positive voltage so that the toner adhering on the part of the photoconductive roller 3 is attracted and transferred to the sheet 12 by the positive voltage of the toner attracting roller 9. A cleaning blade 10 removes a remainder of the toner from the photoconductive roller 3 after the transfer of the toner from the photoconductive roller 3 to the sheet 12.

Subsequently, the sheet 12 is pressed between a heat roller 16 and a pressing roller 17 in a toner fixing device 15 so that the toner is fixed to the sheet 12 by heat and pressing force.

By the reader 19 above the printer 1 forming partially a combination body of the reader 19 and the printer 1 as the claimed first body, an information on a material sheet 29 or 36 over a workpiece glass 28 is read. The read information is used to print an image based on the information, and is stored in the reader 19 or transmitted to the outside of the printing apparatus. A cover 30 swingable on a swing axis 120 as the claimed second body covers the material sheet 36 over the reader 19. The cover 30 includes an auto document feeder (ADF) 31 thereon for exchanging automatically the material sheet 36.

The information on the material sheet 29 on a surface 124 of the workpiece glass 28 is illuminated by a light source 22, and a reflected image of the illuminated information is transmitted through a first mirror 23, a second mirror 24, a third mirror 25 and a focus lens 26 to an image CCD sensor 27 for converting the reflected image to corresponding electrical signals. A first mirror unit 20 with the light source 22 and the first mirror 23 moves horizontally as shown by an arrow B in FIG. 1 to read the information over a whole length of the material sheet 29 when the material sheet 29 is stationary on the reader 19. A second mirror unit 21 with the second mirror 24 and the third mirror 25 thereon moves horizontally as shown by the arrow B by half length and velocity of those of the first mirror unit 20 when the material sheet 29 is stationary on the reader 19. The image CCD sensor 27 reads or scans the reflected image of the information existing along a scanning line 37 moving with the first mirror unit 20.

In the ADF 31, the material sheet 36 is fed one by one by material supply rollers 32 and 33 through a material sheet path 34 onto a material sheet discharge tray 35 so that the information on the material sheet 36 being moved in the material sheet path 34 by the material supply rollers 32 and 33 is illuminated by the light source 22, and the reflected image of the illuminated information is transmitted through the first mirror 23, the second mirror 24, the third mirror 25 and the focus lens 26 to the image CCD sensor 27 for converting the reflected image of the information along the scanning line 37 to corresponding electrical signals while the first and second mirror units 20 and 21 are stationary.

A printed sheet feeder 38 extends from the printer 1 onto the cover 30. The sheet 12 with the printed toner image driven by the heat and pressing rollers 16 and 17 is fed to a printed sheet receiver 39 on the cover 30 through a workpiece transfer path 40 as the claimed workpiece transfer path including a discharge path 41, a transfer roller 42 as the claimed transfer roller for drawing the sheet 12 in the workpiece transfer path 40 and a workpiece sensor 43 for detecting an existence of the sheet 12 in the workpiece transfer path 40.

Figure 3:
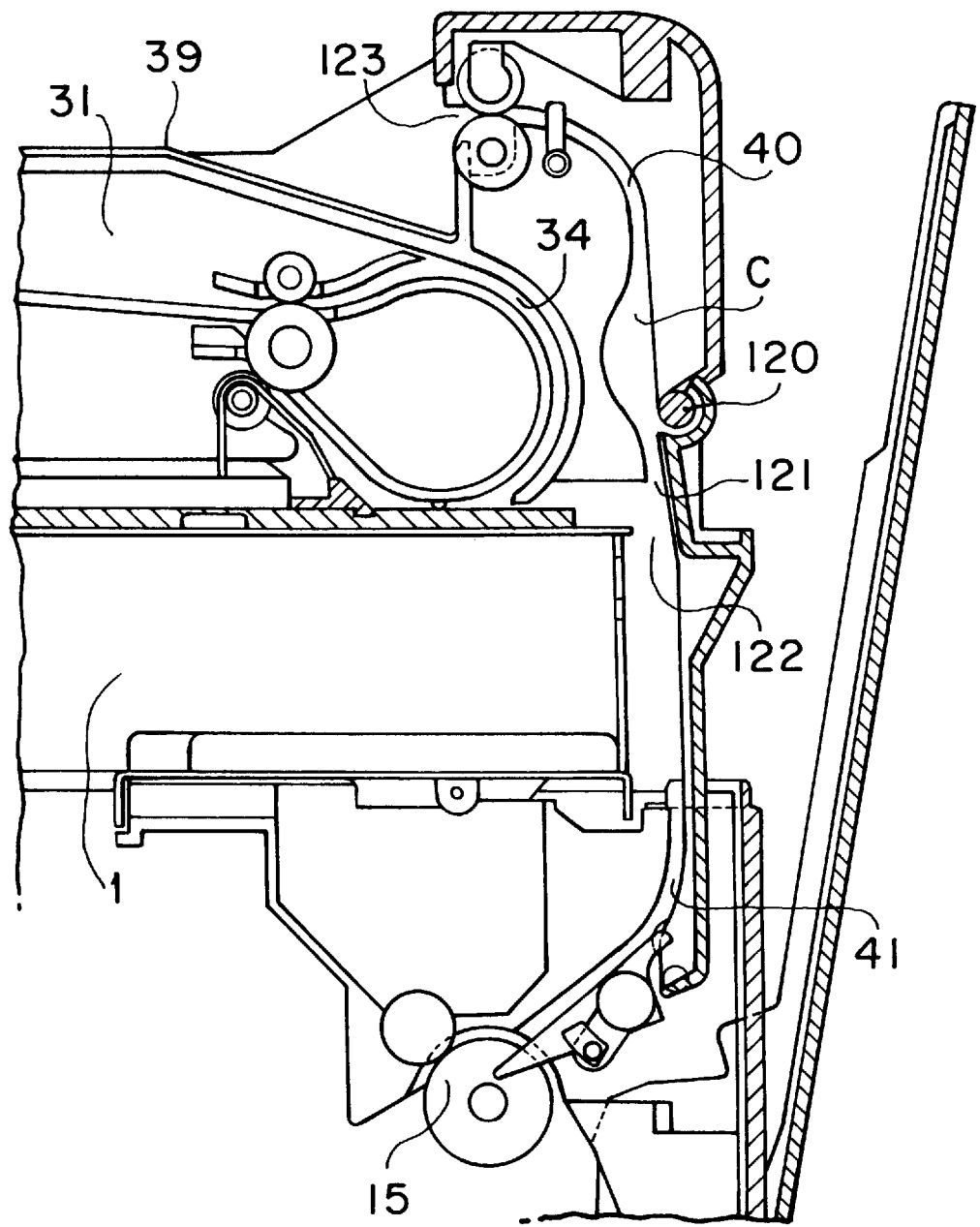
FIG. 3 is a cross-sectional view showing a workpiece transfer path in the printing apparatus of the present invention at a closed position of the second body for covering the reader.
Figure 4:
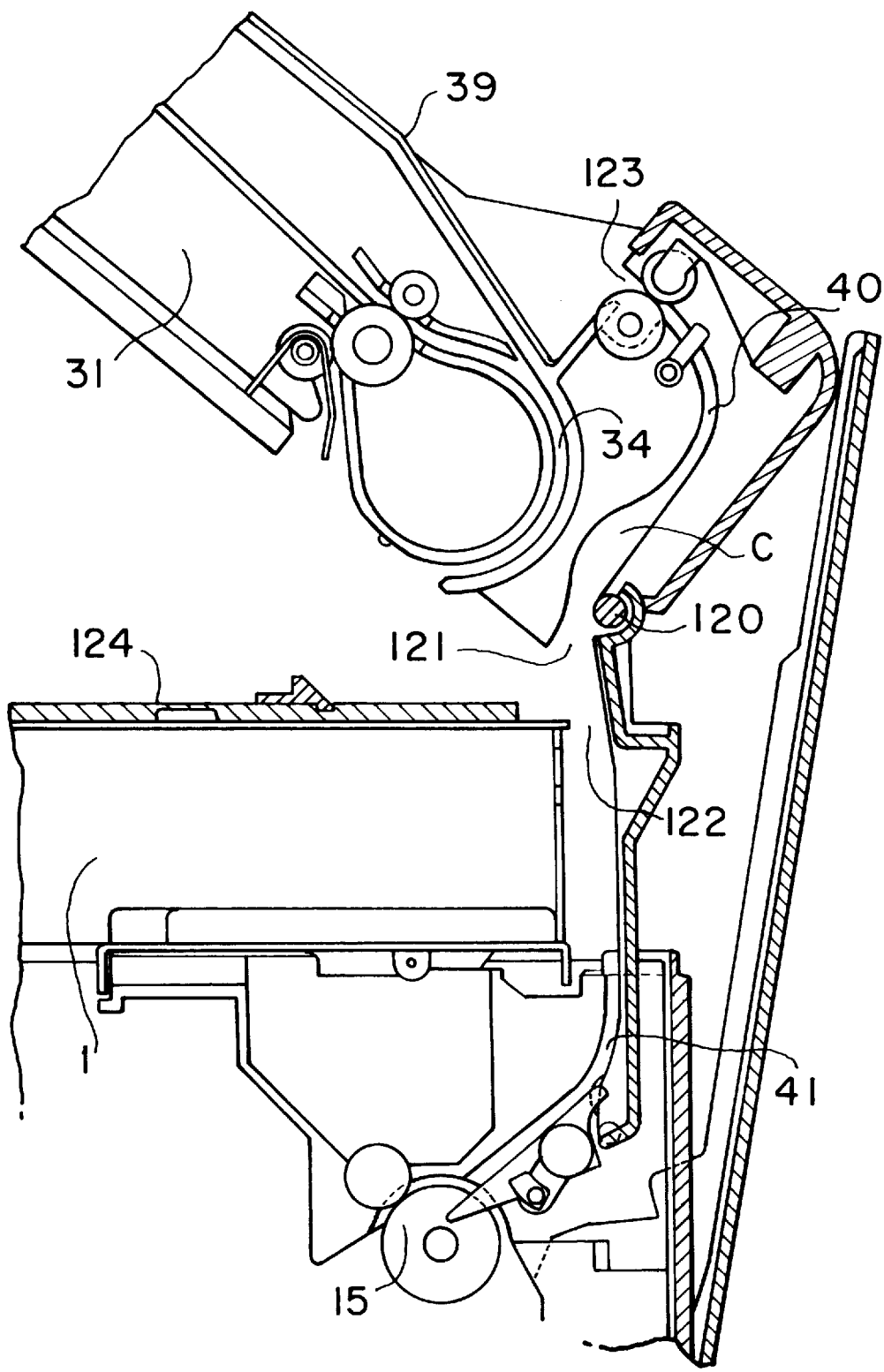
FIG. 4 is a cross-sectional view showing the workpiece transfer path in the printing apparatus of the present invention at an opened position of the second body for uncovering the reader.

As shown in FIG. 3, when the cover 30 is closed to cover the reader 1 with or without the sheet 29 or 36 between the cover 30 and the reader 1, an workpiece intermediate inlet 121 and an workpiece intermediate outlet 122 of the workpiece transfer path 40 face to each other through a relatively small length of a space between the cover and the combination body of the reader 19 and the printer 1. As shown in FIG. 4, when the cover 30 is opened to uncover the reader 1 with or without the sheet 29 or 36 between the cover 30 and the reader 1, an workpiece intermediate inlet 121 and an workpiece intermediate outlet 122 of the workpiece transfer path 40 face to each other through a relatively large length of a space between the cover and the combination body of the reader 19 and the printer 1. The sheet 12 with the printed toner image is moved in the workpiece transfer path 40 to the printed sheet receiver 39 on the cover 30 through the workpiece intermediate inlet and outlet 121, 122, and a workpiece discharge outlet 123.

Since the workpiece transfer path 40 has an enlarged-cross-section portion C composed of a first guide surface for guiding the sheet 12 when the cover 30 is opened to uncover the reader 1 and a second guide surface for guiding the sheet 12 when the cover 30 is closed to the reader 1, the sheet 12 can move smoothly in the workpiece transfer path 40.

Figure 5:
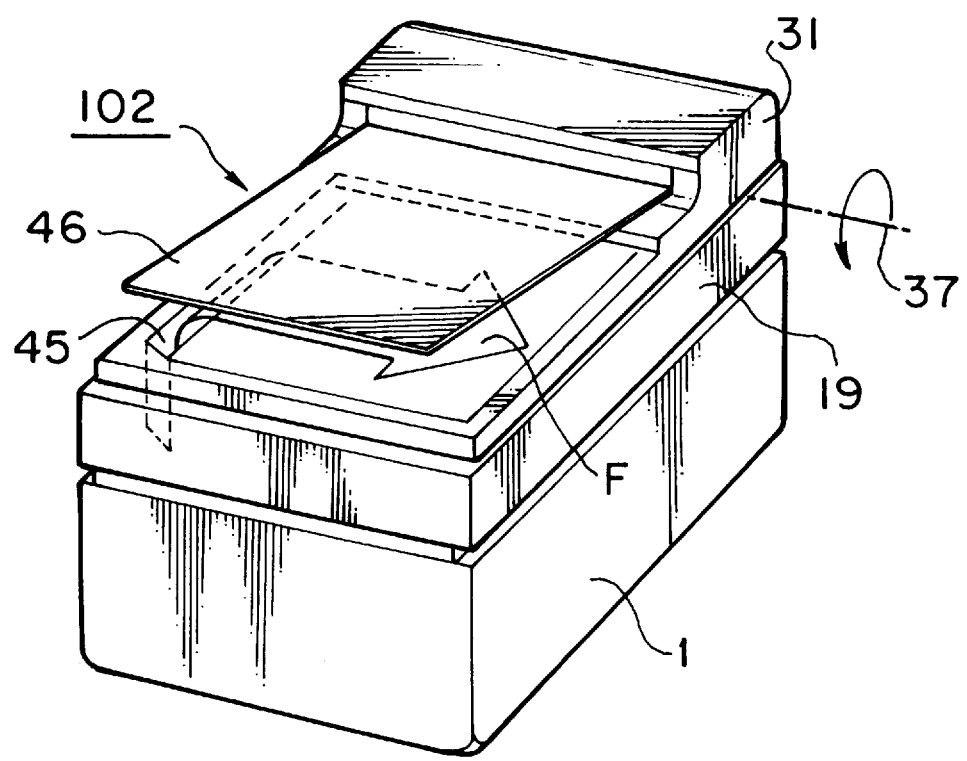
FIG. 5 is an oblique projection view showing the printing apparatus when the reader is covered by the second body.

As shown in FIG. 5, the transfer roller 42, the heat and pressing rollers 16 and 17, the photoconductive roller 3, the toner supply roller 8, the developing roller 6' and the toner attracting roller 9 and a width of sheet 12 moved there by may extend substantially perpendicular to the swing axis 120 and to material supply rollers 32, 33 in ADF. In this case, as shown in FIG. , a longitudinal or sheet-width-direction of a workpiece transfer path 45 as substitute for the workpiece transfer path 40 may extend substantially perpendicular to the swing axis 120 covered by ADF 31 and the material supply rollers 32 and 33 in ADF 31, and the transfer roller 42 and the longitudinal or sheet-width-direction of the workpiece transfer path 45 may extend substantially perpendicular to the material supply rollers 32 and 33. The sheet 12 is discharged to a printed sheet receiver 46 on the cover 30 over reader 19 of printing apparatus 102 in a direction shown by an arrow F.

What is claimed is:

1. A printing apparatus comprising:
   a first body including:
      a reader for reading information from a first workpiece: and
      a printer for printing an image onto a second workpiece;
   a second body which is mounted on the first body to be swingable relative to the first body about a swing axis, and which is arranged over the reader to cover and uncover the reader; and
   a workpiece transfer path for moving the second workpiece with the printed image from the printer to the second body; wherein:
      the workpiece transfer path includes:
         a first guide surface along which the second workpiece with the printed image is guided when the second body is closed; and
         a second guide surface along which the second workpiece with the printed image is guided when the second body is opened; and
         the first and second guide surfaces form an enlarged part of the workpiece transfer path whose cross sectional area is relatively larger than a cross sectional area of another part of the workpiece transfer path adjacent to the enlarged part.

* * * * *